US008910963B2

(12) United States Patent
Battlogg et al.

(10) Patent No.: US 8,910,963 B2
(45) Date of Patent: Dec. 16, 2014

(54) SUSPENSION FORK, IN PARTICULAR FOR A BICYCLE

(71) Applicant: DT Swiss Inc., Grand Junction, CO (US)

(72) Inventors: Stefan Battlogg, St. Anton I.M. (AT); Martin Walthert, Aarberg (CH); Michael Kieber, Schruns (AT); Juergen Poesel, Bludenz (AT)

(73) Assignee: DT Swiss, Inc., Grand Junction, CO (US)

( * ) Notice: Subject to any disclaimer, the term of this patent is extended or adjusted under 35 U.S.C. 154(b) by 0 days.

(21) Appl. No.: 14/012,184

(22) Filed: Aug. 28, 2013

(65) Prior Publication Data
US 2014/0062056 A1 Mar. 6, 2014

(30) Foreign Application Priority Data
Aug. 28, 2012 (DE) .......................... 10 2012 016 946

(51) Int. Cl.
B62K 25/08 (2006.01)
F16F 9/53 (2006.01)

(52) U.S. Cl.
CPC ................. *B62K 25/08* (2013.01); *F16F 9/537* (2013.01); *F16F 9/535* (2013.01)
USPC ....................................... 280/276; 188/267.1

(58) Field of Classification Search
CPC ........... B62K 25/08; F16F 9/532; F16F 9/535
USPC .............................. 280/276; 188/267.1, 267.2
See application file for complete search history.

(56) References Cited

U.S. PATENT DOCUMENTS 4,199,322 A * 4/1980 Danna et al. ...................... 8/186
6,105,987 A * 8/2000 Turner ........................... 280/276
7,413,064 B2 8/2008 Furuya
(Continued)

FOREIGN PATENT DOCUMENTS

DE 661297 C 6/1938
DE 102005040581 B4 4/2011
(Continued)

OTHER PUBLICATIONS

German Patent and Trademark Office Search Report Dated Feb. 25, 2013.

*Primary Examiner* — Tony Winner
(74) *Attorney, Agent, or Firm* — Laurence A. Greenberg; Werner H. Stemer; Ralph E. Locher

(57) ABSTRACT

A damper device for a bicycle suspension fork has a magnetorheological damping medium. A piston partitions a damper chamber into first and second chambers that are connected via a return duct, an adjustable throttle valve, and a transfer duct. A field-generating device generates a magnetic field in a damping duct of the throttle valve. A one-way circuit is provided for the damping medium, with two one-way valves disposed to cause a same direction of circulation of the damping fluid both when the piston rod plunges into and retracts from the damper chamber. A first one-way valves in the piston allows a flow of the damping medium from the second into the first chamber. A second one-way valve in the transfer duct allows a damping medium flow from the transfer duct into the second chamber. The adjustable throttle valve control the plunge and the retraction of the piston rod.

22 Claims, 5 Drawing Sheets

(56) References Cited

U.S. PATENT DOCUMENTS

| | | | |
|---|---|---|---|
| 2001/0004036 A1* | 6/2001 | Gonzalez et al. | 188/319.2 |
| 2007/0102252 A1* | 5/2007 | Yoshimoto | 188/312 |
| 2007/0154507 A1* | 7/2007 | Patton et al. | 424/405 |
| 2008/0061527 A1* | 3/2008 | Inaguma | 280/276 |
| 2009/0001684 A1* | 1/2009 | McAndrews et al. | 280/276 |
| 2012/0186921 A1 | 7/2012 | Battlogg et al. | |

FOREIGN PATENT DOCUMENTS

| | | |
|---|---|---|
| DE | 102011009406 A1 | 7/2012 |
| EP | 0261427 A2 | 3/1988 |
| EP | 1394439 A1 | 3/2004 |

* cited by examiner

SUSPENSION FORK, IN PARTICULAR FOR A BICYCLE

CROSS-REFERENCE TO RELATED APPLICATION

This application claims the priority, under 35 U.S.C. §119, of German patent application DE 10 2012 016 946.9, filed Aug. 28, 2012; the prior application is herewith incorporated by reference in its entirety.

BACKGROUND OF THE INVENTION

Field of the Invention

The present invention relates to a suspension fork for a bicycle. Such a suspension fork comprises a head tube and at least one tube system connected therewith and including an inner tube and an outer tube that is movable and in particular telescoping relative thereto. Adjacent to the tube system there is provided a wheel receiving space. When, as tends to be usual, the suspension fork comprises a pair of parallel, adjacent tube systems, then the wheel receiving space is located between the tube systems.

Different suspension forks have become known in the prior art. A damper system tends to be provided in an inner tube of the suspension fork while a suspension system is accommodated in the other of the inner tubes. Or else it is possible for both a damper system and a suspension system to be provided on one side in the inner tube.

The damping fluid that is used is typically a damping medium based on an oil which passes through one or more damping gap(s) for damping. Due to the different damping ducts and different damping valves, most suspension forks are very complex in structure. The structural volume of suspension forks for muscle-powered vehicles and in particular bicycles is a specific problem. Another significant factor is the weight which is of major importance in particular in sports bicycles and all the more in suspension forks for competitions and in the range of demanding amateurs. It is furthermore advantageous if at least some of the suspension fork components show dimensions so as to be usable in other suspension forks. What must be reliably adhered to is the fitting dimensions. Another significant criterion is the potential suspension travel.

In the case of suspension forks using oil for the damping fluid the damping tends to be adjusted via a plurality of mechanically adjustable valves, separately in the compression stage and in the rebound stage. Moreover, different flow paths also tend to be provided for low-speed damping and for high-speed damping. Additional blow-off valves may be provided which open up in the case of particularly forceful shocks so as to avoid excessive loads. While these known suspension forks operate reliably, their structures are complicated, comprising a plurality of adjusting mechanisms such that it can be difficult to find optimal settings. The structure of suspension forks can be simplified wherein for example magneto-rheological or electro-rheological fluids are employed as the damping medium since then the damping fluid flowing through a damping duct can be exposed to an appropriately adjustable magnetic or electric field by way of which the desired damping can be adjusted and control can be varied as needed.

SUMMARY OF THE INVENTION

It is accordingly an object of the invention to provide a novel suspension fork, which is particularly suited for a bicycle and which overcomes a variety of disadvantages of the heretofore-known devices and methods of this general type and which provides for a suspension fork that is simple in structure and offers variable controlling as required and which fulfills at least some of the further requirements indicated above.

With the foregoing and other objects in view there is provided, in accordance with the invention, a suspension fork for a bicycle, comprising:

a head tube, at least one tube system connected to said head tube and including an inner tube and an outer tube movably disposed relative to one another, and a wheel receiving space adjacent said tube system;

a damper device disposed within said tube system, said damper device having a damper chamber and a movable piston connected to a piston rod and disposed to partition said damper chamber to form a first chamber and a second chamber;

wherein said first chamber and said second chamber are fluidically connected to one another via a return duct, an adjustable throttle valve, and a transfer duct;

said damper device containing a magneto-rheological fluid forming a damping medium thereof and having at least one field generating device disposed to generate a magnetic field in a damping duct formed in said adjustable throttle valve;

a one-way circuit for said damping medium, said one-way circuit having first and second one-way valves configured to cause said damping medium to flow in a same direction of circulation when said piston rod plunges into said damper chamber and when said piston rod retracts out of said damper chamber;

wherein said first one-way valve is disposed at said piston, allowing a flow of said damping medium from said second chamber into said first chamber; and wherein said second one-way valve is disposed at said transfer duct, allowing a flow of said damping medium from said transfer duct into said second chamber, enabling both a plunging of said piston rod into said damper chamber and a retraction of said piston rod out of said damper chamber to be selectively controlled by way of said adjustable throttle valve.

In other words, a suspension fork according to the invention is provided for an at least partially muscle-powered vehicle and, in particular, a bicycle. The suspension fork comprises a head tube and at least one tube system connected therewith. The tube system comprises an inner tube and an outer tube that is movable relative thereto. The inner tube and the outer tube are in particular configured telescoping. Adjacent to the tube system a wheel receiving space is provided. When the suspension fork comprises two tube systems, then the wheel receiving space is provided between the tube systems.

A damper device with a damping medium is provided within the tube system. The damper device comprises a damper chamber and a throttle valve. The damper chamber is partitioned by a movable piston to form a first chamber and a second chamber. The piston is connected with a piston rod. The first chamber is connected with the second chamber via a return duct, the throttle valve, and a transfer duct. The damping medium provided is a magneto-rheological fluid. The throttle valve is controllable. At least one field generating device is provided for generating an adjustable magnetic field in a damping duct of the throttle valve. Furthermore, a control device serves for controlling.

A one-way circuit is provided for the damping medium at least substantially. The one-way circuit is provided with at least two one-way valves. Both when the piston rod plunges into the damper chamber and when the piston rod retracts or emerges from the damper chamber the damping medium flows in the same direction of circulation. At the piston a first one-way valve is disposed allowing flow and in particular only flow of the damping medium from the second chamber into the first chamber. At the transfer duct a second one-way valve is disposed allowing flow and in particular only flow of the damping medium from the transfer duct into the second chamber.

In this way both the plunge of the piston rod into the damper chamber and the retraction or emergence of the piston rod out of the damper chamber can be adjusted selectively and where required variably by means of the controllable throttle valve.

Preferably the throttle valve is disposed axially adjacent to the damper chamber. The axial distance is in particular less than half the length of the damper chamber.

The suspension fork according to the invention has many advantages. A considerable advantage of the easily controllable suspension fork according to the invention consists in the simple structure ensuing from the one-way circuit provided in the tube system. During compressing, as the piston plunges further into the damper chamber, the damping medium is flowing from the second chamber through the one-way valve in the piston into the first chamber. Through the return duct the damping medium optionally travels via the throttle valve back into the second chamber. The damping force is easily adjustable by means of magnetic fields of different strengths. No additional blow-off valve is required since due to the properties of magneto-rheological fluids the chain formation between individual particles breaks up reversibly as a limit load is exceeded.

The one-way valves disposed at the piston or at the transfer duct respectively may be provided not only external of the respective body but else also spaced apart therefrom if they are directly connected therewith. In the sense of the present invention the term "at" also includes the term "in" such that the one-way valves may also be provided in the piston or in the transfer duct.

Preferably an equalizing chamber is provided having an in particular upstream equalizing volume. The equalizing volume is connected with the throttle valve and the second chamber. The equalizing volume is connected with the second chamber in particular via the transfer duct. It is possible in particular via the first switching valve to always switch the equalizing chamber and the equalizing volume to the low-pressure area, i.e. behind the one or more throttle valve(s). This allows to achieve a rigid system not operating into the equalizing volume even with high damping forces. In this way the equalizing volume moreover does not exert any extending forces on the piston which substantially improves responsiveness.

This configuration has considerable advantages. Both in compressing and in rebound at least part of the damping medium flows through the throttle valve unless a continuous piston rod is employed. In a non-continuous piston rod the piston will continue to enter into the damper chamber during compressing such that the damping medium must pass through the first one-way valve in the piston into the first damper chamber. The outwardly path out of the second damper chamber via the second one-way valve is closed since it only allows the damping medium to flow in through the transfer duct into the second damper chamber. In the opposite direction the one-way valve blocks.

In plunging in the piston displaces a volume that is proportional to its cross-sectional area. However, the first suspension chamber only clears a volume that is proportional to the cross-sectional area of the piston minus the cross-sectional area of the piston rod. Therefore, while the piston is plunging in, a portion of the damping medium must flow through the return duct to the throttle valve. Adequate throttling takes place there. This portion of the damping medium then enters into the equalizing chamber.

In rebound the piston rod exits from the damper chamber and a volume of the damping medium proportional to the cross-sectional area of the damper piston must flow into the second damper chamber. Since the first one-way valve in the piston only allows flow of the damping fluid from the second damper chamber to the first damper chamber and blocks it in the opposite direction, the damping medium must enter into the second damper chamber via the transfer duct through the second one-way valve that now opens. At the same time the displaced damping medium exits from the first damper chamber and travels via the return duct to the throttling device. Since the volume required in the second damper chamber is larger than that displaced in the first damper chamber, a proportion corresponding to the piston rod cross section must be suctioned out of the equalizing chamber. In this way flows are present in the same direction of circulation both in the return duct and in the transfer duct both during compressing and during rebound.

This is advantageous since one single controllable throttle valve allows selective and variable damping both of the rebound stage and the compression stage. This considerably facilitates the structure of such a suspension fork. Weight can be saved as well and the constant flow results in good mixing of the magneto-rheological fluid.

Preferably the equalizing chamber is disposed at an axial distance from the piston. Particularly preferably the equalizing chamber is disposed axially adjacent to the damper chamber and advantageously preferably disposed axially beside the second chamber.

In preferred configurations it is possible for the throttle valve to be connected with the equalizing chamber via a first check valve. The first check valve allows the damping medium to only flow from the throttle valve into the equalizing chamber.

Preferably the equalizing chamber is connected with the second chamber via a second check valve. The second check valve allows the damping medium to only flow from the equalizing chamber into the second chamber.

Particularly preferably at least one of the check valves is adjustable to allow an adjustable flow resistance in the compression stage and/or the rebound stage. In such a configuration it is possible for the equalizing chamber to be connected with the transfer duct via two separate equalizing ducts. One of the equalizing ducts is provided with the first check valve while the second equalizing duct is equipped with the second check valve.

In these configurations it is in particular possible for the check valves to be adjustable external of the suspension fork for example for changing the characteristic curves of mechanical check valves. In this case the check valve is configured as an adjustable throttle valve with a backflow preventer. When a mechanical throttle valve is used in such a configuration then the throttle valve serves for example for setting the basic characteristic curve while the two adjustable check valves serve for example for adapting the basic characteristic curve to the desired characteristic curve in the case of the rebound stage and the desired characteristic curve in the case of the compression stage.

The damping medium comprises at least one magneto-rheological fluid and the damping medium is in particular configured as a magneto-rheological fluid (MRF). The throttle valve is preferably configured controllable, comprising at least one field generating device for generating a magnetic field in at least one damping duct of the throttle valve. The throttle valve is configured controllable and generates a correspondingly controlled magnetic field in the damping duct of the at least one throttle valve. Furthermore, a control device preferably serves for controlling. Basically, electrorheological fluids (ERF) have also become known other than magneto-rheological fluids. However, an MRF is considerably better suited to the intended purposes since ERF requires high control voltages. Another drawback of ERF is the fact that no permanent fields can be induced. MRF however allows to set specific throttling states currentless by means of permanent magnets or to utilize the remanence of materials. Then the magnetic field strength of a permanent magnet is set permanently for example by way of a brief magnetic pulse. The magnetic field strength once set is maintained for a long time following the magnetic pulse without requiring further external energy. These options do not exist with ERF.

Such a configuration is particularly advantageous since magneto-rheological damping media show fast responses to applied magnetic fields. It is possible for a permanent magnet to be employed as a field generating device. Such a permanent magnet may for example be mechanically changed in its position for changing the damping force acting in the damping duct. It is also possible to employ a permanent magnet whose magnetic field is superposed by the magnetic field of an electric coil in relation to the requirements desired at the time. Thus the permanent magnet allows to set a continuously acting damping which is for example attenuated or amplified as needed by the magnetic field of the electric coil.

It is also possible for the field generating device to comprise what is presently called a remanence magnet whose magnetic field strength is adjusted periodically as needed or at irregular intervals by way of a magnetic pulse of an assigned electric coil. Such a remanence magnet is permanently set to a specific magnetic field strength by way of the magnetic pulse of a duration of for example just a few milliseconds. Then when the magnetic field strength of the remanence magnet is to be reduced, this may occur e.g. by an alternating field that is attenuated over time. A solution for the basic structure of a throttle valve having a remanence magnet may in particular be found in U.S. Pat. No. 8,485,324 B2 and its counterpart European published patent application EP 2 339 203 A2. A preferred structure of a valve operating that operates with remanence is preferably fashioned after that document.

An electrically adjustable throttle valve and a magneto-rheological fluid enable a particularly flexible control of the damping characteristics. Independently of mechanical adjustment options such a controllable throttle valve opens up the option of real time control involving real-time response to a shock even while the shock is increasing and before it reaches its maximum. Presently this may be ensured by the response rate of an e.g. magneto-rheological fluid which within one millisecond or slightly longer is capable of interlinking along the field lines of a magnetic field and thus of considerably increasing the flow resistance transverse thereto.

In all the configurations at least one control device and at least one sensor device are preferably provided. The controllable throttle valve can be adjusted by means of the control device in dependence on sensor signals. Basically a great variety of sensors may be provided. Preferably at least one sensor device is provided for capturing a rate for a relative speed.

In particular is the sensor device provided for capturing a rate for a relative speed of the piston to the damper chamber. Or else it is possible for a sensor device to capture a relative speed of the inner tube and the outer tube relative to one another. It is also possible for a relative speed of the inner tube to be captured for example in the vertical direction to be able to deduce therefrom the current loads. It is also possible to capture the acceleration rate(s) by one or more sensors. It is also possible to combine various types of sensors.

Particularly preferably at least one sensor device is provided for capturing a direction of the relative motion between the pistons and the damper chamber. This is of importance e.g. when using magneto-rheological fluids since solely the flow of the damping medium within the one-way circuit does not permit to readily state whether the damping medium is flowing in a compressing or a rebounding action. To solve this problem at least one sensor device may be provided in simple cases for capturing the direction of the relative motion comprising for example at least one deflecting spring leaf which is preferably biased in a central position by means of suitable biasing devices.

This sensor device may for example be provided in the equalizing chamber or at an equalizing duct leading to the equalizing chamber. The deflection of the spring leaf that serves for example as a detector allows to sense whether the damping medium is flowing out of, or else into, the equalizing chamber. Correspondingly the deflection of the detector allows to determine whether compression or rebound takes place. It is only required for the detector to be placed in an area through which the damping medium flows in both cases. It is also possible to provide two separate sensor devices which separately sense compressing and rebounding.

Or else it is possible that a sensor device is present which senses a dimension of a suspension travel. The changes of the suspension travel over time allow the deduction whether the suspension fork is in compression or in rebound. It is also possible to employ at least one acceleration sensor whose data allow to deduce compression or rebound.

In all the configurations it is possible and preferred to provide at least one end position damping. Such an end position damping can increase damping in an end portion during compressing or rebound to prevent knock-through at the suspension fork.

Particularly preferably the first chamber is located beneath the second chamber in use as intended. Preferably the throttle valve is disposed above the damper chamber. Particularly preferably the equalizing chamber is provided above the throttle valve. Or else the equalizing chamber may be provided beneath or to the side of the throttle valve so as to reduce the length of the flow paths.

These configurations allow a particularly simple structure to be obtained. Concurrently, filling up the equalizing chamber, for example with pressurized air, is easy. The throttle valve disposed on top or the equalizing chamber disposed above also allows ease of filling-up or ease of changing the damping medium. Heat dissipation is also easy since in the top portion of the suspension fork the inner tube is not or not at all times surrounded by the outer tube.

Such a configuration also shows the considerable advantage of optimal utilization of the space present in a suspension fork. While the available diameter tends to be small, the length within the inner tubes or outer tubes can be utilized.

It is particularly preferred to provide insert devices or at least one insert device between the tube system and the damper chamber. The insert device is configured such that at least portions of the return duct are provided at the insert device. Preferably the insert device defines the flow cross-section of the return duct. The insert device allows to considerably reduce the flow cross-section of the return duct. Thus the total weight of the suspension fork can be noticeably reduced which is a considerable advantage for high-level requirements.

In particular a greatest length, extension, or largest diameter of a flow cross-section of the return duct at the insert device is smaller than a diameter of the tube system. In particular a greatest length or greatest extension of the flow cross-section at the insert device transverse to the flow direction is smaller than a radius and particularly preferably smaller than half the radius of the tube system. In particular are the dimensions of the tube system presently related to the outer diameter and particularly preferably to the inner diameter of the inner tube.

In the prior art the entire clearance between the outer walls of the damper chamber and the inner walls of the outer tube is used as a flow duct. In such a configuration the entire clearance between the outer wall of the damper chamber and the inner wall of the inner tube would presently be filled with the damping medium. Due to the considerable volume of said clearance a considerable quantity of damping medium would be present therein which would quite considerably increase the total weight of the suspension fork. A solution to reducing the weight might consist in diminishing the clearance by way of reducing for example the internal space or the inner diameter of the inner tube. This would create a smaller clearance such that a reduced mass of damping medium would be present therein. However, such a solution would show the drawback that compatibility of the suspension fork with the usually employed dimensions would no longer be given. Inner tubes and outer tubes as they are usual these days could no longer be used. This would considerably increase the design expenses for such a fork.

In the alternative the outer diameter of the damper chamber might be increased to allow a smaller gap in the clearance. Again in this solution a smaller mass of damping medium would collect in the clearance so as to allow weight reduction. The drawback of this solution is, however, that the wall friction during flow of the damping medium would quite considerably increase. Thus it would be difficult to set the required damping characteristics since the high flow resistance in the clearance would virtually prohibit the setting of low damping values.

Incidentally, decreasing the inner diameter of the inner tube would likewise ensue in an increased flow resistance of the damping medium.

This means that both a decrease of the diameters of the inner tube and an enlargement of the damper chamber would not offer a satisfactory solution. Now the surprising solution is to position in the clearance at least one insert device which delimits a defined return duct. The return duct at the insert device preferably shows a small peripheral surface compared to its cross-section. This reduces the wall friction at the return duct. The cross-sectional area that is large in comparison to the peripheral surface allows high flow rates of the damping medium without inadmissibly increasing the flow resistance.

Preferably the insert device is additionally made of a material and structured such that a mean density of the insert device between the tube system and the damper chamber ensues which is lower than a mean density of the damping medium. Such a measure ensures the saving of weight.

In preferred embodiments the mean density of the insert device is less than half the mean density of the damping medium or at least less than three quarters of the density of the damping medium. This allows considerable weight reduction of the suspension fork while at the same time both high damping rates and low damping rates can be set. Closed hollow spaces in the insert device or particularly lightweight materials allow considerable weight reduction.

In preferred embodiments at least one further throttle valve is provided as a lowering valve with a further field generating device. The further throttle valve as the lowering valve may for example be provided for lowering, or for keeping lowered, the suspension fork in uphill rides.

The further throttle valve as the lowering valve may comprise an electric coil as the field generating device as does the throttle valve described above. It is also possible to provide a remanence magnet and/or a permanent magnet as the field generating device. In all the configurations the lowering valve is preferably connected in series with the throttle valve.

For example if an electric coil is employed then this field generating device generates an appropriate magnetic field only if lowering the suspension fork is desired for example in uphill rides and the suspension fork is in the rebound state. Then the increased damping causes the suspension fork to be reliably positioned in the lowered state. At the same time the damping of shocks is still possible. After the uphill ride the lowering valve may be deactivated such that the suspension fork quickly returns to its normal, rebound position in normal operation.

For example if only a permanent magnet is chosen as the field generating device for the lowering valve it will as a rule act both in rebound stage damping and in compression stage damping. Following a first compressing action, this will result in increased damping characteristics of the suspension fork.

It is possible that for example a permanent magnet is mechanically movable between a normal position and another position such as a lowered position. The permanent magnet may for example be provided at a rotatable device externally surrounding the inner tube. By means of a control lever the permanent magnet may be brought to the desired angular position where it acts on the lowering valve contactless through the inner tube.

In all the configurations it is preferred for at least one one-way valve and/or at least one check valve to be configured as a shim valve. Such a shim valve may comprise a stack of different disks providing a non-linear behavior at the check valve.

Particularly preferably at least one one-way valve and/or at least one check valve is adjustable. This may be done for example externally.

When an MRF is employed as the damping medium it is preferred to provide at least one adjustable valve device having remanence characteristics. An adjustable valve device may consist of one valve or of two or more single valves connected in series. One of the valves may be configured as a lock valve which allows the damping medium to pass in one direction only in particular purely mechanically e.g. as a shim valve. Another valve or partial valve may be incorporated in the lock valve of the adjustable valve device or disposed adjacent to the lock valve. The further valve may operate on a mechanical and/or electrical and/or magneto-rheological basis, damping the flow through a damping duct of the further valve to the desired extent by generating or applying an adjustable, predetermined or constant magnetic field. The further valve within the adjustable valve device may be provided on a basis of remanence. Then an electric coil is assigned to the further valve for generating magnetic pulses with which to change or adjust a permanently acting magnetic field in a hard or soft magnetic material.

It is also possible for the adjustable valve device to comprise at least one permanent magnet and/or at least one electric coil for generating or applying a desired magnetic field.

It is also preferred for at least one adjustable valve device to comprise a remanence valve or to consist of one remanence valve only which operates on a magneto-rheological basis and whose magnetic field is adjustable by way of at least one pulse of an electric coil.

Basically it is preferred for at least one adjustable valve and/or at least one check valve to be configured as an adjustable valve device.

To summarize once more: The novel suspension fork for bicycles has a head tube and a tube system connected therewith which comprises an inner tube and an outer tube movable relative thereto wherein a wheel receiving space is provided adjacent to the tube system. A damper device with a damping medium is provided within the tube system wherein the damper device comprises a damper chamber and a throttle valve. The damper chamber is partitioned by a piston that is movable and connected with a piston rod to form a first chamber and a second chamber. The first chamber is connected with the second chamber via a return duct, the throttle valve, and a transfer duct. The damping medium comprises a magneto-rheological fluid and the throttle valve is adjustable. A field generating device is provided for generating a magnetic field in a damping duct of the throttle valve. A one-way circuit is provided for the damping medium in which two one-way valves are provided such that both when the piston rod plunges into the damper chamber and when the piston rod emerges from the damper chamber the damping medium flows in the same direction of circulation. A first of the one-way valves is disposed at the piston allowing a flow of the damping medium from the second chamber into the first chamber. In the transfer duct a second one-way valve is disposed allowing a flow of the damping medium from the transfer duct into the second chamber. Both the plunge of the piston rod into the damper chamber and the retraction of the piston rod out of the damper chamber can be selectively controlled by means of the adjustable throttle valve.

Other features which are considered as characteristic for the invention are set forth in the appended claims.

Although the invention is illustrated and described herein as embodied in suspension fork, in particular for bicycles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
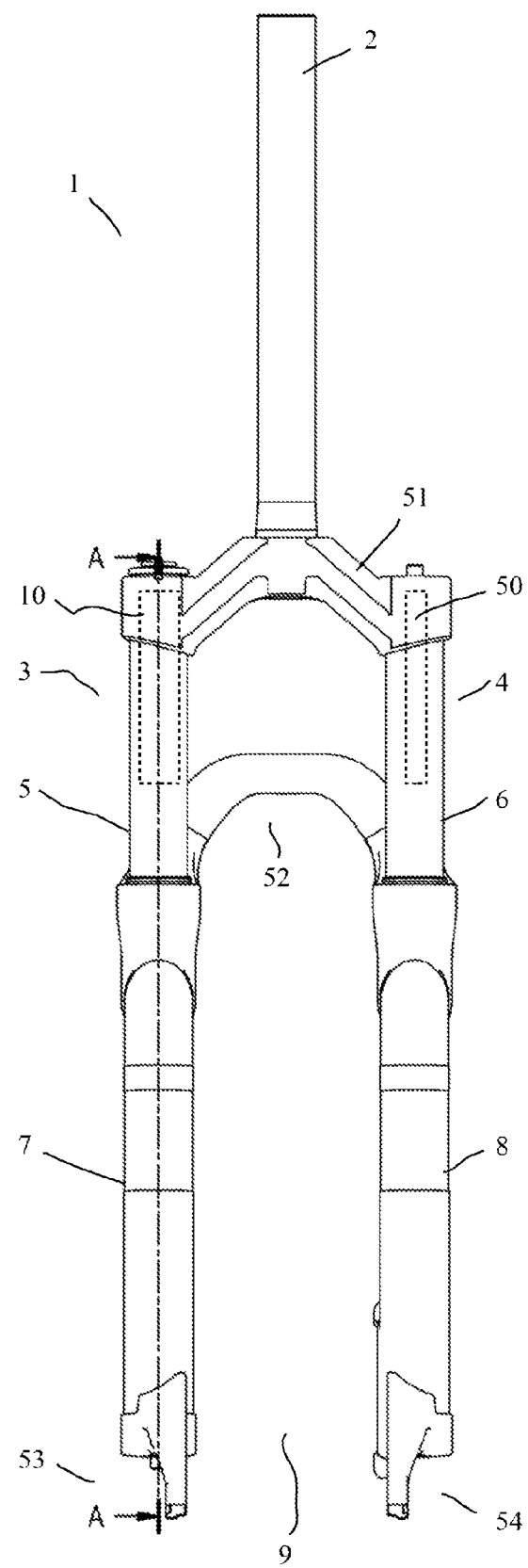
FIG. 1 is a front view of a suspension fork according to the invention.

Referring now to the figures of the drawing in detail and first, particularly, to FIG. 1 thereof, there is seen a suspension fork 1 according to the invention in a front view. The suspension fork 1 comprises a head tube 2 at which a fork crown 51 is attached. The two tube systems 3 and 4 are disposed at the fork crown 51. Each of the tube systems comprises an inner tube and an outer tube.

The tube system 3 comprises the inner tube 5 and the outer tube 7 while the tube system 4 comprises the inner tube 6 and the outer tube 8. The two outer tubes 7 and 8 are connected with one another by means of a connecting bracket 52. Both the tube systems 3 and 4 are configured telescoping. The lower end of the suspension fork is provided with dropouts 53 and 54 between which a bicycle wheel may be disposed. To this end the wheel receiving space 9 is provided between the tube systems 3 and 4.

In the illustrated exemplary embodiment a damper device 10 is disposed in the tube system 3 while a suspension device 50 is disposed in the tube system 4.

Figure 2:
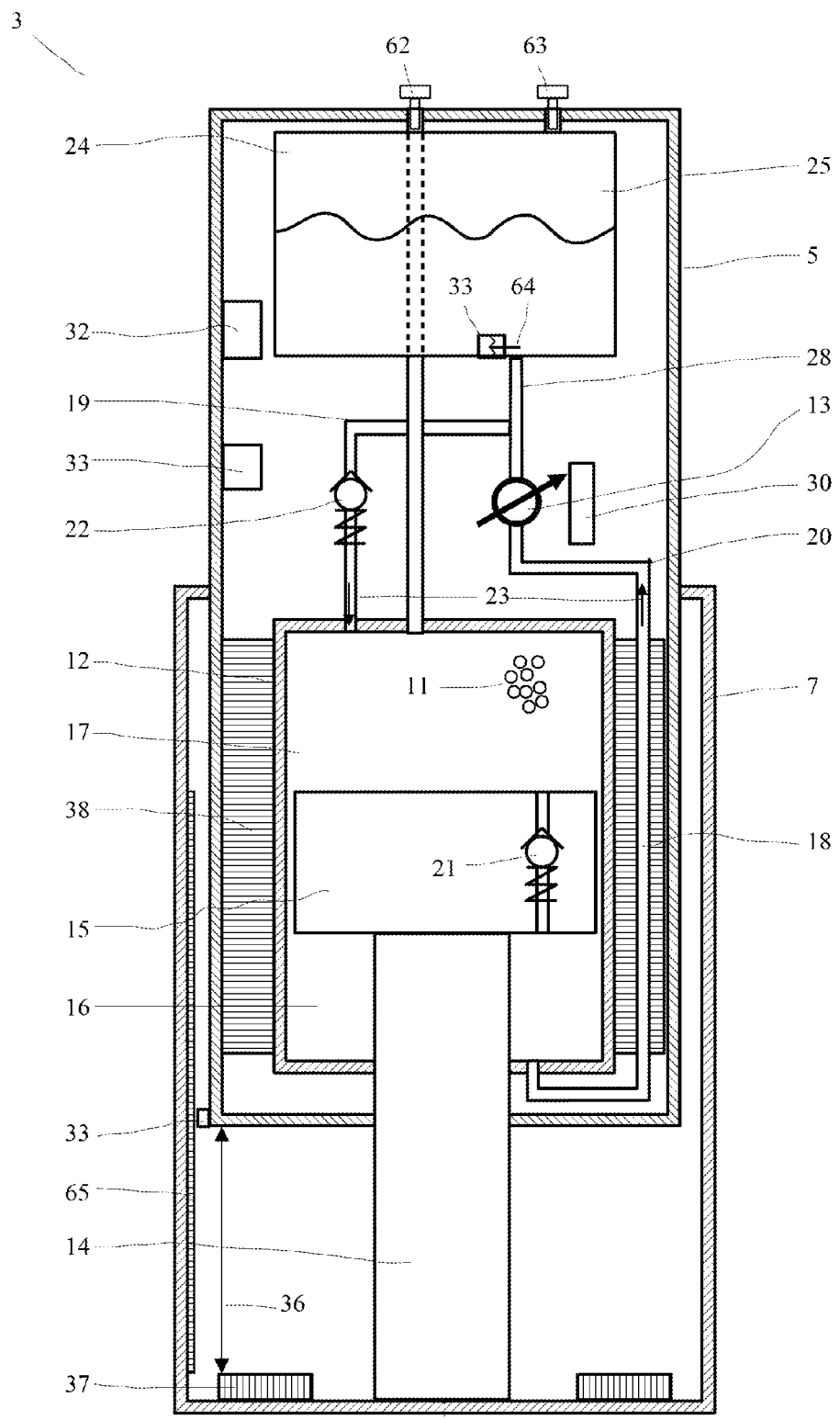
FIG. 2 is a diagrammatic and schematic view of a tube system with a damper device for the suspension fork according to FIG. 1 in a first embodiment.

FIG. 2 shows a schematic cross-sectional illustration of the tube system 3 of the suspension fork of FIG. 1.

The inner tube 3 is connected with the frame of a bicycle (not illustrated) via the fork crown 51. The outer tube 7 telescopingly glides on the inner tube 5. In the interior of the inner tube 5 the damper device 10 is disposed comprising a damper chamber 12 which is partitioned by means of a piston 15 to form a first chamber 16 and a second chamber 17.

The piston 15 is provided with a piston rod 14 which extends through the first chamber 16, protruding out of the inner tube 5. The other end of the piston rod is connected with the lower end of the outer tube 7. The throttle valve 13, which is presently electrically adjustable, is disposed above the damper chamber 12. A field generating device 30 is assigned to the throttle valve 13 serving for generating a magnetic field.

The damping medium 11 presently employed is a magneto-rheological fluid. Employing electro-rheological fluids is likewise conceivable.

A first one-way valve 21 is provided in the piston 15 which is otherwise configured as a pump piston. The one-way valve 21 may for example be configured as a shim valve and it allows the damping medium 11 to only flow from the second chamber 17 through the piston 15 into the first chamber 16 when the pressure within the second chamber 17 is higher than within the first chamber 16. In the opposite direction the one-way valve 21 blocks.

At what is presently the lower end of the first chamber 16 the return duct 18 begins through which the damping medium 11 can flow from the first chamber 16 to the throttle valve 13. The damping medium 11 flowing in the direction of circulation 23 flows through the throttle valve 13 where it is dampened according to the settings of the field generating device 30.

The transfer duct 19 following the throttle valve 13 leads to the second one-way valve 22 which opens up in the direction of circulation 23 when the pressure within the transfer duct 19 is higher than the pressure in the second chamber 17. Here the equalizing duct 28 branches off the transfer duct 19 toward the equalizing chamber 24 in which an equalizing volume 25 is present. The equalizing volume 25 may for example be a flexible bellows under superpressure or a balloon or the like elastically separated from the volume of the equalizing chamber 24. It is also possible to employ a dividing piston or a spring for biasing.

The return duct 18 extends through the clearance between the damper chamber 12 and the inner peripheral surface of the inner tube 5. In that clearance an insert device 38 is located providing a defined cross-section for the return duct 18. In this way the volume of the damping medium 11 can be reduced considerably since only the cross-section of the return duct 18 at the insert device 38 is filled with the damping medium 11 and no longer the entire clearance. This enables the weight of the damper device 10 and the entire suspension fork 1 to be reduced to a considerable degree.

A control device 32 serves to control the system. The controller, or control device, 32 is connected with sensors 33 which detect the current state of the suspension fork and respond correspondingly. For example a sensor device 33 may detect the suspension travel 36 at short time intervals such that the signal time curve allows to also deduce relative speeds and thus acceleration values. It is also possible to employ acceleration sensors. The suspension travel 36 may be detected via position detection of the sensor device 33 relative to a measuring device 65.

End position damping 37 may be provided to prohibit the outer tube 7 from hitting against the inner tube 5.

In operation a shock will lead to compressing of the piston 15. Since the damping medium cannot escape upwardly via the one-way valve 22 and since the pressure in the second chamber 17 increases, the first one-way valve 21 opens and damping medium 11 flows from the second chamber through the first one-way valve 21 into the first chamber 16.

Since in compressing, more damping medium is displaced in the second chamber 11 than is available in the first chamber 16, the volume corresponding to the entering piston rod 14 must flow through the return duct 18 in the direction of circulation 23 toward the throttle valve 13 where the damping duct 31 of the throttle valve 13 is exposed to the magnetic field of the field generating device 30. Thus the damping medium is damped accordingly.

From the throttle valve 13 the damping medium 11 flows a short distance through the transfer duct 19 and then through the equalizing duct 28 into the equalizing chamber 24. The inflow of the damping medium 11 can be detected by the detector 64 of the sensor device 33 at the inlet into, or within, the equalizing chamber 24. The bending or twisting in the flow direction of the detector platelet employed as the detector 64 allows to deduct the case of the compression stage.

In rebound, i.e. in the case of the rebound stage, the piston 15 moves downwardly in the illustration according to FIG. 2 and a corresponding portion of the piston rod 14 reemerges from the damper chamber 12. The damping medium 11 located in the first chamber 16 cannot pass into the second chamber 17 through the one-way valve 21 that is now blocking but it must flow through the return duct 18 in the same direction of circulation 23 as it had been the case in the compression stage.

The damping medium 11 flowing through the return duct 18 flows through the throttle valve 13 where it is now exposed to an accordingly adapted magnetic field of the field generating device 30.

Since in the case of the rebound stage, due to the piston rod volume, the quantity of damping medium 11 exiting from the first chamber 16 is less than is required for equalizing in the second chamber 17, the second one-way valve 22 opens and damping medium exits from the equalizing chamber 24. The damping medium enters through the equalizing duct 28 and the transfer duct 19 into the second chamber 17. When the damping medium 11 exits from the equalizing chamber 24 the detector platelet as the detector of the sensor device 33 deforms accordingly so as to allow to deduct the case of the rebound stage.

The exemplary embodiment according to FIG. 2 may be realized by way of an electrically operated throttle valve 13 in which a conventional oil is employed as the damping medium.

Figure 3:
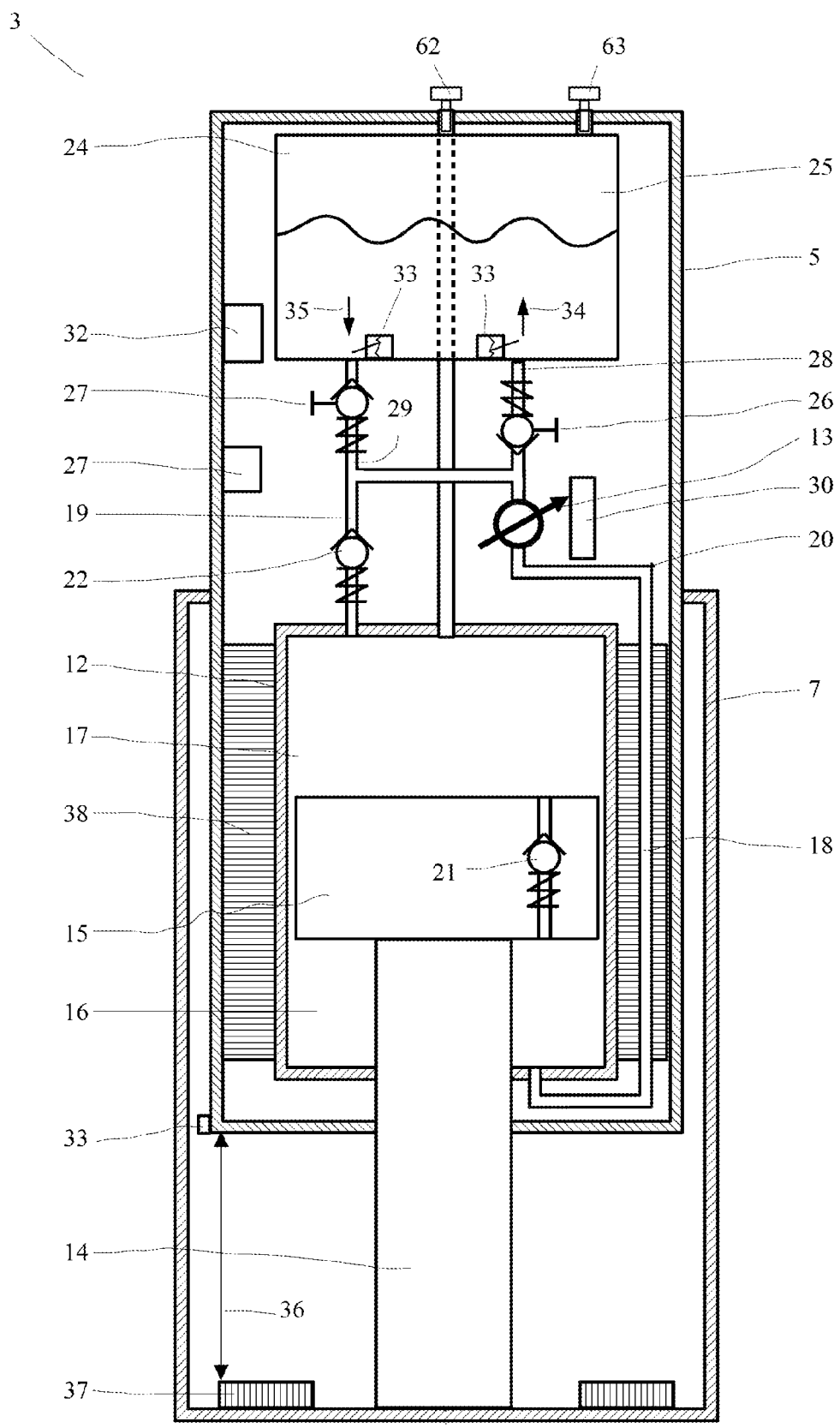
FIG. 3 is a similar view of a tube system with a damper device for the suspension fork according to FIG. 1 in a second embodiment.

FIG. 3 shows another exemplary embodiment wherein another simplistic cross-section illustrates the tube system 3 of a suspension fork 1 according to FIG. 1. Basically the tube system 3 according to FIG. 3 is similar in structure to the tube system 3 according to FIG. 2. Unlike the illustration according to FIG. 2, however, the transfer duct 19 following the throttle valve 13 is partitioned to form two equalizing ducts 28 and 29 for exchange with the equalizing chamber 24.

In the first equalizing duct 28 from the throttle valve 13 toward the equalizing chamber 24 a first check valve 26 is provided which only allows flow of the damping medium 11 from the throttle valve 13 into the equalizing chamber 28. A sensor device 33 at the entrance to the equalizing chamber can detect the direction 34 of the relative motion and thus deduce the case of the compression stage.

To allow the damping medium 11 to exit from the equalizing chamber 24 the second equalizing duct 29 is provided with a second check valve 27 disposed thereat. This check valve 29 only opens when the pressure in the equalizing chamber 24 is higher than the pressure in the transfer duct 19.

In the present exemplary embodiment the check valves 26 and 27 are adjustable. It is possible for operating elements to be provided at the exterior of the suspension fork such that the check valves 26 and 27 may be operated by the rider during the ride as required. Adjusting knobs can be provided for this purpose e.g. at the fork crown. An electric remote control is likewise possible.

In these configurations it is possible that the throttle valve 13 is an electrically adjustable throttle valve and that the damping medium 11 employed is a magneto-rheological fluid.

Or else a conventional oil is possible and an adjustable or a fixedly set throttle valve 13. Due to the different valves 26 and 27 and optionally the throttle valve 13 the damping characteristics of the suspension fork 1 can be adjusted separately for the rebound stage and the compression stage. An all mechanical solution does not require any sensor devices 33. In this case a control device 32 may be dispensed with.

In case that the suspension fork 1 according to FIG. 3 is operated with a magneto-rheological fluid, it may still be the case to provide the check valves 25 and 26 adjustable or preadjustable since this allows adaptation to a basic curve. Depending on the situation the throttle valve 13 can then be adjusted.

As is already illustrated in FIG. 1, valves 62 and 63 are likewise provided in FIG. 2 and FIG. 3. The valve 62 may serve for filling up or changing damping medium 11 while the valve 63 serves for example for checking the air pressure in the equalizing volume 25 of the equalizing chamber 24 or else for filling up compressed air.

Figure 4:
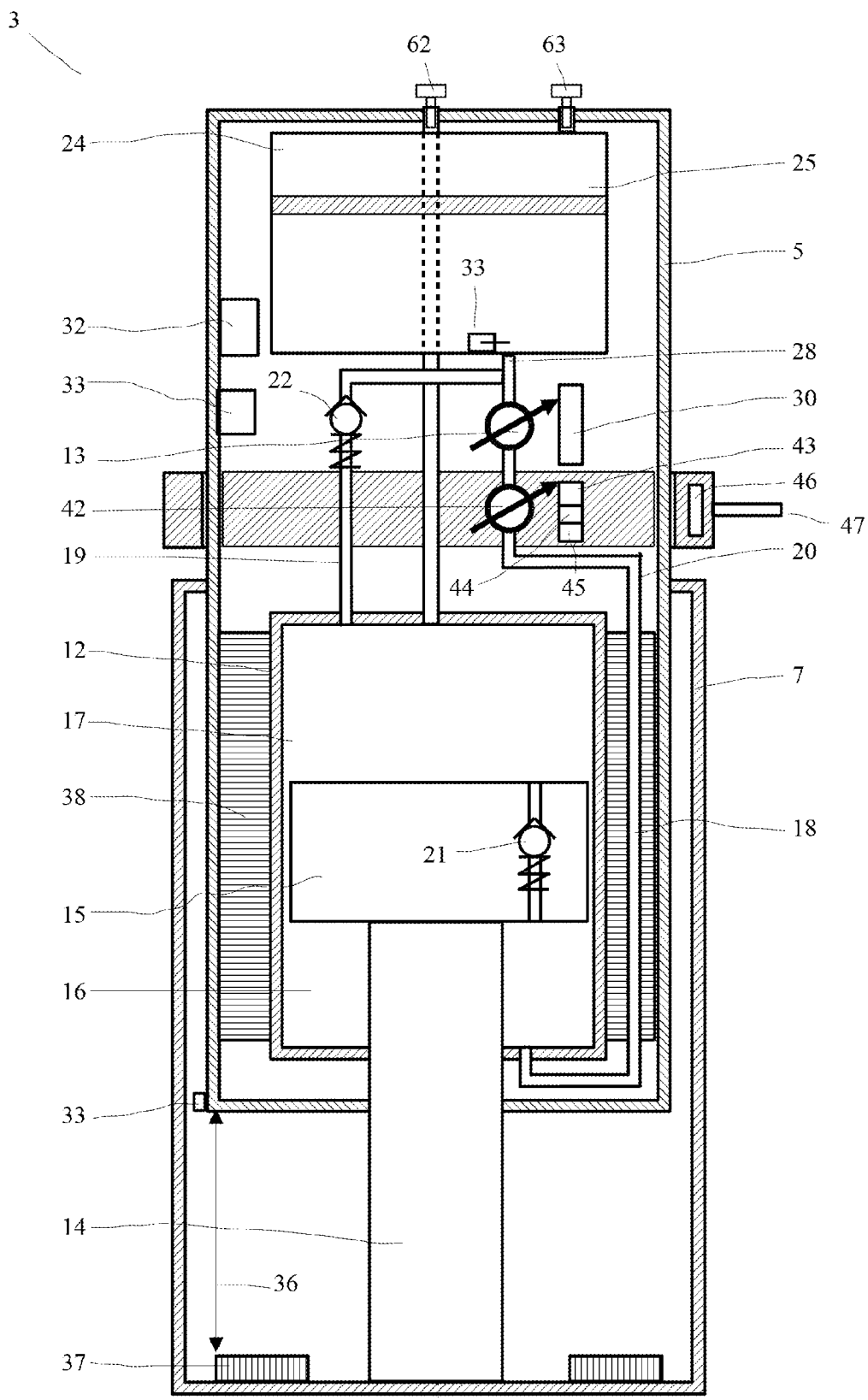
FIG. 4 is a similar view of a tube system with a damper device for the suspension fork according to FIG. 1 in a third embodiment.

FIG. 4 shows another tube system 4 for a suspension fork 1 according to FIG. 1. This tube system 4 is again basically similar in structure to the tube system 4 according to FIGS. 2 and 3.

Unlike the configuration according to FIG. 2 the tube system according to FIG. 4 also comprises a lowering valve 42 which is disposed in series and presently ahead of the throttle valve 13. Presently the damper device 10 is equipped with a magneto-rheological fluid as the damping medium 11 such that the field generating devices 30 and 43 are provided for the throttle valve 13 and the lowering valve 42.

The field generating device 43 according to FIG. 4 may comprise an electric coil 44 which generates an appropriate magnetic field. It is also possible to provide for example a remanence magnet 45 the field strength of which is adjusted to the currently desired value as required or at periodical intervals by magnetic pulses of the electric coil 44. This allows to generate in the remanence magnet 45 a permanent magnetic field which is available even after disconnecting the current needed for the electric coil 44. If required the magnetic field strength of the field generating device 43 can also be modified by a magnetic field of the electric coil 44.

As an alternative or additionally, a permanent magnet 46 may be provided at an external operating lever which is for example disposed rotatably around the inner tube 5. Positioning the permanent magnet 46 such that its magnetic field applies a magnetic field to the lowering valve 42 as desired allows to generate an appropriate magnetic field in the lowering valve 42. Rotating the magnetic field away causes it to cease acting on the lowering valve 42.

In the simplest of cases only an electric coil 44 is employed for generating a field. Then it is possible in a simple way to prohibit automatic rebound of a suspension fork once it has been compressed a certain distance. This occurs in that in the case of the rebound stage an additional magnetic field will always be generated at the lowering valve 42 which additionally dampens rebound. This results in a permanently lowered suspension fork which is advantageous for example in uphill rides. At the same time individual damping of shocks is possible.

Figure 5:
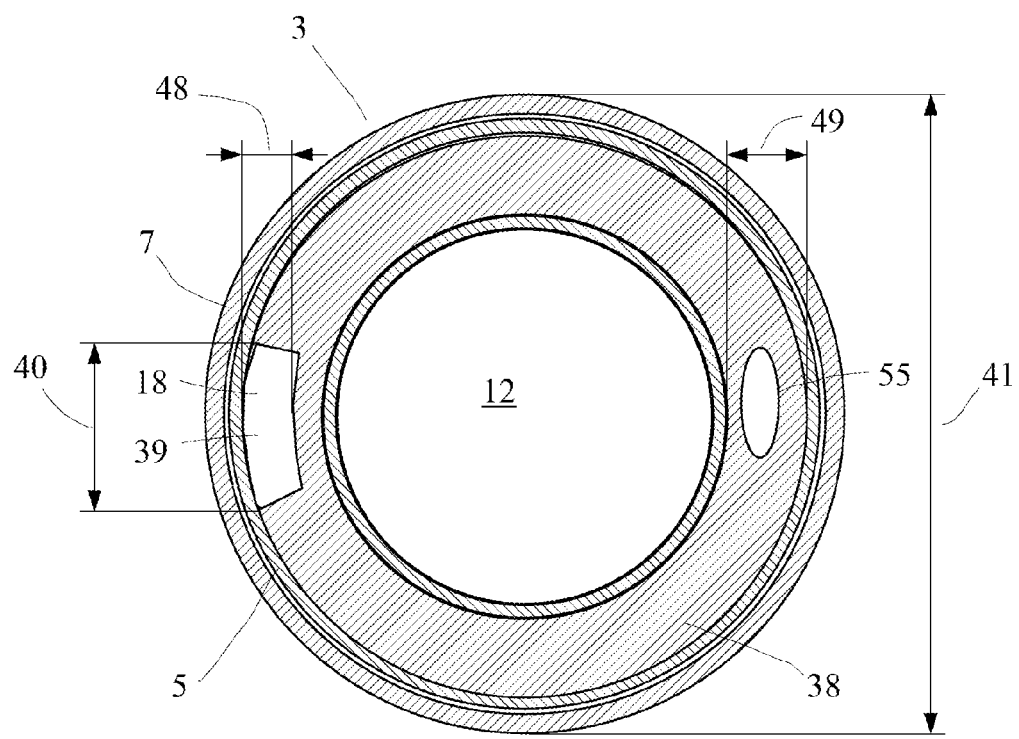
FIG. 5 a schematic cross-section of a tube system of a suspension fork according to FIGS. 2 to 4.

FIG. 5 shows a typical cross-section of a tube system according to FIG. 2, 3, or 4. The non-sectional damper chamber 12 can be recognized in the center. The inner tube 5 of the tube system 3 is illustrated radially outwardly in section. The outer tube 7 which telescopes relative to the inner tube 5 follows radially outwardly.

A radial distance 49 ensues from the damper device 10 or the damper chamber 12 which is presently virtually entirely filled by an insert device 38. The insert device 38 may be one-piece but it may also be formed of two or more parts. While the insert device 38 in the exemplary embodiments substantially extends over the length of the damper chamber 12, it may be longer or shorter.

One of the sides is provided with a return duct 18 at the insert device 38. The return duct 18 presently serves as a return duct for the damping medium 11 on its way from the first chamber 11 via the throttle valve into the equalizing chamber 24 or into the second chamber 17. The return duct 18 may show the presently illustrated shape or else other shapes such as round, square, or rectangular shapes. Basically any other shape is likewise conceivable such as an elliptic shape.

It is particularly advantageous for the relationship of the cross-sectional area as the flow cross-section 39 to the periphery of the return duct 18 to be large such that the flow resistance of the damping medium 11 in the return duct 18 remains relatively low even with high flow rates. To this end the relationship of the largest diameter or the longest extension 40 to the width 48 is presently relatively small. In particular is the length 40 smaller than the diameter 41 of the tube system and in particular smaller than the radius of the tube system, and preferably smaller than half the radius of the tube system. On the other hand the flow cross-section 39 is as large as required.

On the other hand a duct of a similar configuration may be provided. It is possible for both ducts to be e.g. rectangular or elliptic in cross section. The other duct 55 may for example serve for feeding through electric lines or the like. It is also possible to employ both ducts as return ducts.

On the whole the insert device may be solid in configuration and it is also possible for the insert device 38 to show hollow portions or hollow chambers so as to reduce the average density of the insert device 38. The insert device may consist of a metal and/or plastic at least in part.

The average density of the insert device 38 at least in the range of the clearance between the tube system 4 and the damper chamber 12 is lower than is the density of the damping medium 11 and in particular half the density at the most. This allows to save a considerable proportion of the weight. Trials have shown that it was possible to reduce the weight of the damper device by substantially more than 10%. Twenty percent and more are likewise conceivable.

Figure 6:
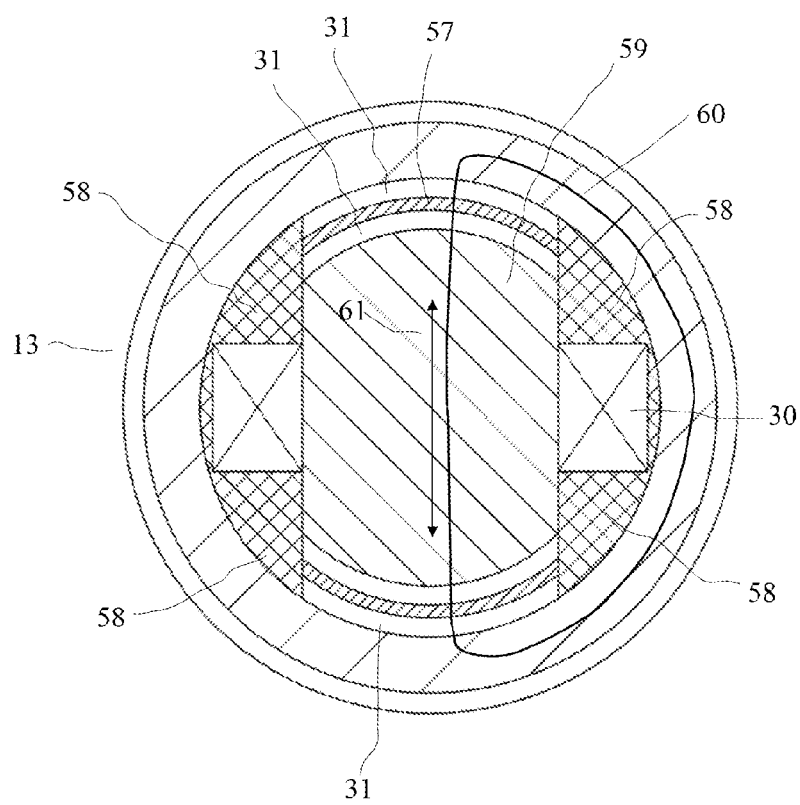
FIG. 6 a schematic cross-section of a throttle valve as it may be employed in a preceding embodiment.

FIG. 6 shows a schematic cross section of an exemplarily illustrated throttle valve 13. The inside of the presently illustrated throttle valve 13 is provided with a central core 59 that is surrounded by a wound electric coil as the field generating device 30. Presently a total of four damping ducts 31 are provided which are separated in pairs from one another by a fan or a fan-like structure 57. This increases efficiency.

When a magnetic field is applied, the field lines 61 run through the core 59, pass approximately perpendicularly through a damping duct 31, the subsequent fan 57 and the second damping duct 31, and they are guided through the ring 60 of a magnetically conductive material, presently approximately in a semicircle around the core, until in the lower portion two damping ducts 31 are provided once again with a fan wall 57 in-between through which the field lines pass approximately perpendicularly such that continuous field lines 61 are present on the whole. In FIG. 4 one field line only is illustrated for representation.

Magnetic insulating materials 58 are provided adjacent to an electric coil 30 to shape the magnetic field as desired.

On the whole the invention provides an advantageous suspension fork comprising advantageous characteristics in particular when for example magneto-rheological fluids are used. A high stroke length is enabled since the inserts in the tube system 3 can be compact in configuration. In a normal case one single throttle valve 13 is required to achieve efficient and different damping characteristics both in the case of the compression stage and in the case of the rebound stage.

Using an insert device allows to reduce the total weight of the usable suspension fork by nearly 5% or more so as to clearly increase attractiveness both for use in sports and in competition.

When using conventional damping oils or other fluids and with purely mechanical throttle valves an advantageous suspension fork can be structured as well.

The following is a list of reference numerals used in the above description and may aid the reader in the perusal of the specification:

1 suspension fork
  2 head tube
  3 tube system
  4 tube system
  5 inner tube
  6 inner tube
  7 outer tube
  8 outer tube
  9 wheel receiving space
  10 damper device
  11 damping medium
  12 damper chamber
  13 throttle valve
  14 piston rod 15 piston, pump piston
16 first chamber
17 second chamber
18 return duct
19 transfer duct
20 one-way circuit
21 first one-way valve
22 second one-way valve
23 direction of circulation
24 equalizing chamber
25 equalizing volume
26 first check valve
27 second check valve
28 equalizing duct
29 second equalizing duct
30 field generating device
31 damping duct
32 control device
33 sensor device
34 direction
35 direction
36 suspension travel
37 end position damping
38 insert device
39 flow cross-section
40 diameter, length
41 diameter
42 lowering valve
43 field generating device
44 electric coil
45 remanence magnet
46 permanent magnet
47 lowered position
48 width
49 distance
50 suspension device
51 fork crown
52 connecting bracket
53 dropout
54 dropout
55 duct
57 fan
58 insulating material
59 core
60 ring
61 field line
62 valve
63 valve
64 detector
65 measuring device

The invention claimed is:

1. A suspension fork for a bicycle, comprising:
a head tube, at least one tube system connected to said head tube and including an inner tube and an outer tube movably disposed relative to one another, and a wheel receiving space adjacent said tube system;
a damper device disposed within said tube system, said damper device having a damper chamber and a movable piston connected to a piston rod and disposed to partition said damper chamber to form a first chamber and a second chamber;
wherein said first chamber and said second chamber are fluidically connected to one another via a return duct, an adjustable throttle valve, and a transfer duct;
said damper device containing a magneto-rheological fluid forming a damping medium thereof and having at least one field generating device disposed to generate a magnetic field in a damping duct formed in said adjustable throttle valve;
a one-way circuit for said damping medium, said one-way circuit having first and second one-way valves configured to cause said damping medium to flow in a same direction of circulation when said piston rod plunges into said damper chamber and when said piston rod retracts out of said damper chamber;
wherein said first one-way valve is disposed at said piston, allowing a flow of said damping medium from said second chamber into said first chamber; and
wherein said second one-way valve is disposed at said transfer duct, allowing a flow of said damping medium from said transfer duct into said second chamber, enabling both a plunging of said piston rod into said damper chamber and a retraction of said piston rod out of said damper chamber to be selectively controlled by way of said adjustable throttle valve.

2. The suspension fork according to claim 1, which comprises an equalizing chamber with an upstream equalizing volume is connected with said throttle valve and said second chamber.

3. The suspension fork according to claim 2, wherein said throttle valve is connected with said equalizing chamber via a first check valve that only allows a flow of said damping medium from said throttle valve into said equalizing chamber.

4. The suspension fork according to claim 3, wherein said equalizing chamber is connected with said second chamber via a second check valve that only allows a flow of said damping medium from said equalizing chamber into said second chamber.

5. The suspension fork according to claim 4, wherein at least one of said first and second check valves is adjustable to allow an adjustable flow resistance in at least one of a compression stage or in a rebound stage.

6. The suspension fork according to claim 1, wherein at least one of a ratio of an outer diameter of said piston rod to an outer diameter of said piston lies between 0.2 and 0.4, or a ratio of said outer diameter of said piston rod to said outer diameter of said piston rod is adapted to a specified relationship of a basic damping in the compression stage and a basic damping in the rebound stage.

7. The suspension fork according to claim 1, which further comprises a control device and at least one sensor device.

8. The suspension fork according to claim 7, wherein said at least one sensor device is configured for capturing a rate for a relative speed of said piston to said damper chamber, or for capturing a direction of a relative movement between said piston and said damper chamber, or for capturing a measure for a suspension travel.

9. The suspension fork according to claim 1, which further comprises at least one end position damping device in said tube system.

10. The suspension fork according to claim 1, wherein said first chamber is disposed below said second chamber, in an orientation of intended use, and said throttle valve is disposed above said damper chamber.

11. The suspension fork according to claim 10, wherein said equalizing chamber is disposed above said throttle valve.

12. The suspension fork according to claim 1, which comprises an insert device disposed between said tube system and said damper chamber, and wherein at least portions of said return duct are disposed at said insert device.

13. The suspension fork according to claim 12, wherein said insert device defines a flow cross-section of said return duct, and a largest diameter of a flow cross-section of said return duct at said insert device is smaller than a diameter of said tube system.

14. The suspension fork according to claim 12, wherein the largest diameter of the flow cross-section of said return duct at said insert device is smaller than a radius of said tube system.

15. The suspension fork according to claim 12, wherein a mean density of said insert device is lower than a mean density of said damping medium.

16. The suspension fork according to claim 1, which comprises a further throttle valve forming a lowering valve with a further field generating device.

17. The suspension fork according to claim 16, wherein said lowering valve is connected in series said the throttle valve.

18. The suspension fork according to claim 16, wherein said further field generating device comprises one or more of an electric coil, a remanence magnet, or at least one permanent magnet.

19. The suspension fork according to claim 18, wherein said at least one permanent magnet is movably disposed between a normal position and a lowered position.

20. The suspension fork according to claim 16, wherein said damping medium is disposed such that a magnetic field influences a flow behavior of said damping medium.

21. The suspension fork according to claim 1, wherein at least one of at least one-way valve or at least one check valve is a shim valve.

22. The suspension fork according to claim 1, wherein at least one of at least one-way valve or at least one check valve is adjustable.

* * * * *